United States Patent Office
3,073,377
Patented Jan. 15, 1963

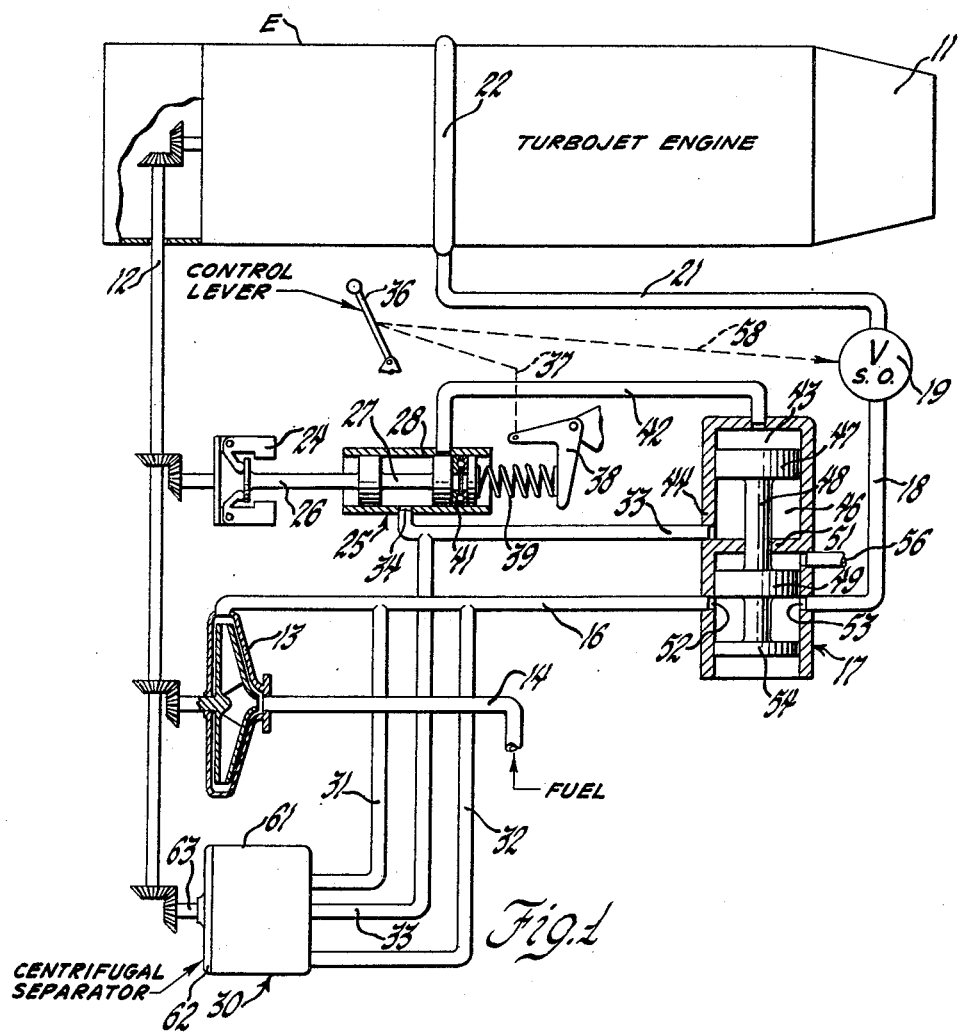
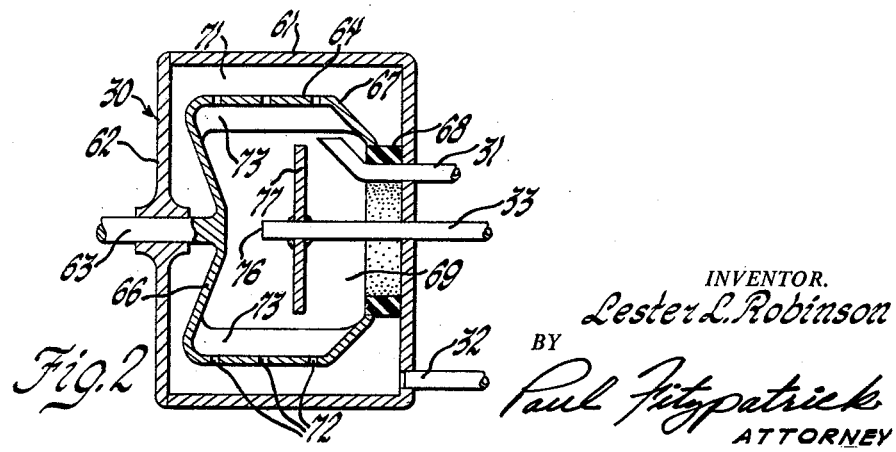

3,073,377
FUEL CONTROL WITH DIRT SEPARATOR
Lester L. Robinson, Indianapolis, Ind., assignor to General
Motors Corporation, Detroit, Mich., a corporation of
Delaware
Filed July 16, 1959, Ser. No. 827,505
6 Claims. (Cl. 158—36.4)

My invention relates to fuel controls, and is directed to providing improved means for supplying clean or purified fuel to the hydraulic servo mechanisms present in many fuel controls the application of the invention to typical fuel control means for a gas turbine engine is described herein. It will be apparent, however, that the invention is applicable to various fuel controls for other purposes.

By way of background, it may be pointed out that many gas turbine fuel controls include fuel metering valves and other mechanisms operated by hydraulic servo systems. For example, such hydraulic systems may control fuel in response to such conditions as rotational speed of the engine, air inlet pressure, air inlet temperature, temperature of the combustion or exhaust gases, and forward speed of the aircraft. In general, such controls include some device responsive to the condition which is a factor controlling the supply of fuel to the engine and some form of servomechanism connecting the responsive device or various responsive devices to a fuel metering valve, a pump displacement control, or other suitable means which determines the quantity of fuel supplied to the engine. While electric and pneumatic servomechanisms are used in some cases, hydraulic servos are favored in many controls in actual use.

Where such hydraulic servos are used, it is quite advantageous to use fuel under pressure as the operating medium for the servo. Fuel under pressure necessarily is present in such fuel systems and controls, and use of the fuel reduces the complications and the contamination or sealing problems which result if a distinct servo fluid such as oil is used in the fuel control.

Precise and reliable operation of such servomechanisms requires that the operating medium be quite clean. If dirt is present in the operating medium, it may cause erratic operation of the servo control valves and servo pistons, and may even cause failure of the control because of sticking of such movable parts. The fuel available for gas turbine engines is relatively clean, but it may be expected to contain quantities of dirt incompatible with successful operation of the servos. The best prior solution to this problem, so far as I am aware, has been to provide a special very fine filter through which the servo fuel is passed. It would be impractical to employ such fine filters for the entire quantity of fuel supplied to the engine.

This prior arrangement suffers from the usual disadvantages of filter arrangements. The filters load up and must be cleaned. In order to insure operation of any device supplied through a filter, it is customary to provide a bypass around the filter through a resistance valve so that clogging of the filter will not immediately make the device inoperative. However, if the filter is bypassed, the dirty fuel may soon cripple the fuel control, for the reasons pointed out above.

My invention disposes of these difficulties of prior art fuel controls by providing a centrifugal separator so organized with the rest of the fuel system that it separates out a small amount of very clean fuel for use in the servomechanisms, and allows the greater part of the fuel, carrying with it the dirt, to flow through the main metering valve to the engine. The separator cannot clog like a filter and does not require any sort of emergency bypass.

The nature of the invention and the advantages thereof will be apparent to those skilled in the art from the succeeding detailed description of an embodiment thereof in a gas turbine fuel control and the accompanying drawings.

FIGURE 1 is a schematic diagram of an elementary turbojet engine fuel control system.

FIGURE 2 is a sectional view of the centrifugal separator taken on a plane containing the axis of rotation of the separator.

The engine E shown in FIGURE 1 may be any usual type of gas turbine engine, including a compressor and a turbine joined by shafting so that the turbine drives the compressor, and having combustion apparatus supplied with air by the compressor and delivering combustion products to the turbine. The engine shown is a turbojet engine in which the combustion products, after passing through the turbine, are discharged from a propulsion nozzle 11. However, the invention is applicable to other types of turbine engines and to other engines and fuel consuming devices employing fuel controls with hydraulic servomechanisms.

Proceeding with the illustrative fuel control system, the turbine of the engine E drives an accessory drive shaft 12 which is geared to a fuel pump 13, shown as a centrifugal pump, which is supplied with fuel through a conduit 14 from a suitable source. The pump 13 delivers fuel to the engine through a pump outlet conduit 16, a metering valve or fuel regulating means 17, a duct 18, a shutoff valve 19, a conduit 21, and a fuel manifold 22 of the engine from which fuel may be supplied to the main combustion apparatus or any other combustion apparatus of the engine.

The metering valve 17 may be and usually is controlled in response to a number of factors, as mentioned above, but for the purpose of illustrating this invention, only control by a governor device responsive to speed of the engine is shown. This control comprises a speed responsive flyweight device 24 driven by accessory drive shaft 12. The flyweights act against the stem 26 of a valve spool 27 reciprocable in the valve body 28 of a servo valve 25.

Operating medium, which may be called servo fuel for conciseness, is supplied to the servo valve by a centrifugal separator 30, the rotor of which is driven by the shaft 12. The structure and operation of a suitable centrifugal separator will be described subsequently. The separator has an inlet line 31 connecting it to the outlet of pump 13 through conduit 16 and an outlet line 32 through which fuel containing whatever dirt may be present is returned to the conduit 16. There is also a servo fuel outlet conduit 33 through which clean fuel is supplied to port 34 of the servo valve. The servo valve 25 may be arranged to have a variable speed setting determined by a pilot's control lever 36, coupled by suitable transmission means indicated at 37 and a bellcrank 38 to a speeder spring 39 which acts on the valve spool 27 in opposition to the flyball device 24 through a thrust bearing 41. As will be apparent, if the speed of the engine is above that called for by the governor setting, spool 27 will shift to the right to supply servo fuel through a line 42 to a chamber 43 within the housing or case 44 of the metering valve 17. Servo fuel is also supplied through line 33 to a chamber 46 of the metering valve. The pressures in chambers 43 and 46 bias a servo piston 47 in opposite directions. It will be noted that the effective area of the upper end of the piston exposed to chamber 43 is greater than that of the lower face of the piston exposed to chamber 46 because of the area of stem 48 which connects the servo piston to a metering valve plunger 49. Stem 48 passes through an opening in a wall 51 of the case 44.

The metering valve plunger 49 variably throttles one or both of ports 52 and 53 through which fuel passes from the pump outlet conduit 16 to the metered fuel duct 18. It will be noted that a head 54 is provided and that the upper face of plunger 49 is vented through a line 56 so that the metering valve is balanced.

It will be apparent that the servo valve, servo piston, and metering valve structure described is conventional; and it may be pointed out that this is merely illustrative of innumerable hydraulic systems to which the invention may be applied. Vent or return means by which the used servo fuel is returned to the fuel inlet line 14 are ordinarily provided, but are not illustrated in order to avoid unnecesary complication of the drawing. The shut-off valve 19 is a conventional element in such controls and may be operated by any suitable connection, indicated at 58, to the control lever 36 so that it is closed when the control lever is moved to the engine shutdown position and is otherwise open.

In view of the conventional nature of the servo and metering system, it is believed that a description of the operation thereof would be redundant.

FIGURE 2 is an axial sectional view of the separator 30. Immaterial structural details of the separator which have no bearing on the invention are omitted. Various known separators may be adopted for this system, but FIGURE 2 illustrates the preferred type of separator. The separator 30 is enclosed in a casing 61 including a cover 62. A shaft 63 entering the casing through a suitable bearing mounts a generally cylindrical or cup-shaped rotor 64 which is closed at one end by the disk 66 and includes an inwardly directed flange 67 at the other end. Any suitable seal 68, which may be a contact type seal or a labyrinth seal, is provided between the flange 67 and the casing so that the rotor divides the space within the casing into an inner chamber 69 within the rotor and an outer chamber 71 between the rotor and the casing. The peripheral portion of the rotor is provided with a number of openings or perforations 72 through which fuel may flow from the inner to the outer chamber, and is provided with axially extending pumping vanes 73 distributed around the inner surface thereof which cause the fluid within the inner space to whirl with the rotor, so that contrifugal force tends to drive the fuel, and particularly dirt carried along with the fuel, through the openings 72 into the outer chamber. This is the usual mode of operation of a centrifugal separator. The solid contaminants or dirt will be heavier than the fuel, so will move outwardly from the axis of the rotor.

The fuel inlet line 31 enters the inner chamber at a joint substantially spaced from the axis and near one end of the rotor. The contaminated fuel outlet line 32 communicates with the outer chamber 71. The claim fuel or servo fuel outlet line 33 enters the casing along the axis of rotor 64 and has an inlet at 76 adjacent the disk 66 at the axis where the fuel is cleanest. A circular baffle or disk 77 mounted on the clean fuel outlet conduit 33 further inhibits any direct communication between the inlet 31 and the outlet 33. The fuel is circulated from line 31 to line 33 by the pressure developed by pump 13. This is a rather small flow, and, as the fuel moves slowly inward toward the outlet 76, the heavier dirt particles are contrifuged out and flow with the major part of the fuel into space 71 and conduit 32. It will be noted that lines 31 and 32 communicate with points at substantially the same pressure connected to the outlet of pump 13. The centrifugal effect of rotor 64 insures circulation through the separator. Line 32 may be of such capacity or be suitably throttled so as to avoid excessive flow through the separator, or the flow may be metered by the orifices 72 of the separator.

No fuel is wasted, since the contaminated fuel which is passed through the separator is metered and supplied to the engine. It is not intended that the separator clean the fuel supplied to the engine, which should be sufficiently clean to meet the requirements of the engine. The clean or servo fuel may be returned in the usual way to the inlet of pump 13 after it has served its purpose.

It will be seen that the invention provides a highly satisfactory solution to the problem of supplying clean servo fluid to the servomechanisms of the control. Since the servo fuel requirement is small, the separator may be small and adds very little weight or complexity to a fuel control. Since fuel controls ordinarily include a shaft driven by the engine to drive a speed responsive device such as 24 for governing or metering purposes, the addition of a small centrifugal separator presents a very small problem. However, the separator may be distinct from the fuel control assembly, if desired.

It should be emphasized that the particular fuel control system illustrated is merely an example chosen so that a complete operative embodiment of the invention may be disclosed. The invention may be applied to various control systems embodying hydraulic servos of various sorts.

The detailed description of preferred embodiments of the invention for the purpose of explaining the principles thereof is not to be considered as limiting or restricting the invention, since many modifications may be made by the exercise of skill in the art within the scope of the invention.

I claim:

1. A fuel supply and control system for a combustion engine comprising, in combination, means for supplying fuel under pressure, fuel metering means, a conduit connecting the supplying means to the metering means, regulating means for the metering means including at least one servomechanism employing fuel as an operating medium, a duct adapted to connect the metering means to an engine, and means for supplying clean fuel to the servomechanism as the operating medium therefor comprising a centrifugal separator having a fuel inlet connected to the said conduit, a contaminated fuel outlet connected to the said conduit for delivering contaminated fuel to said metering means along with the main flow of fuel from said supplying means, and a clean fuel outlet connected to the said servomechanism, the centrifugal separator being of a type adapted to generate a pressure rise between the said inlet and the contaminated fuel outlet.

2. A fuel supply and control system for a combustion engine comprising, in combination, means for supplying fuel under pressure, fuel metering valve means, a conduit connecting the supplying means to the metering means, a servomotor operating the metering means and employing fuel as an operating medium, a servo valve controlling the servomotor, a duct adapted to connect the metering means to an engine, and means for supplying clean fuel to the servo valve and servomotor comprising a centrifugal separator having a fuel inlet connected to the said conduit, a contaminated fuel outlet connected to the said conduit for delivering contaminated fuel to said metering means along with the main flow of fuel from said supplying means, and a clean fuel outlet connected to the said servo valve and servomotor, the centrifugal separator being of a type adapted to generate a pressure rise between the said inlet and the contaminated fuel outlet.

3. A fuel supply and control system for a combustion engine comprising, in combination, means for supplying fuel under pressure, fuel metering means, a conduit connecting the supplying means to the metering means, regulating means for the metering means including at least one servomechanism employing fuel as an operating medium, a duct adapted to connect the metering means to an engine, and means for supplying clean fuel to the servomechanism as the operating medium therefor comprising a centrifugal separator having a fuel inlet connected to the said conduit, a contaminated fuel outlet connected to the said conduit for delivering contaminated fuel to said metering means along with the main flow of fuel from said supplying means, and a clean fuel outlet connected to the said servomechanism, the centrifugal separator including a rotor adapted to pump fuel from the said inlet to the said outlet.

4. A fuel supply and control system for a combustion engine comprising, in combination, means for supplying fuel under pressure, fuel metering means, a conduit connecting the supplying means to the metering means, regulating means for the metering means including at least one servomechanism employing fuel as an operating medium, a duct adapted to connect the metering means to an engine, and means for supplying clean fuel to the servomechanism as the operating medium therefor comprising a centrifugal separator having a fuel inlet connected to the said conduit, a contaminated fuel outlet connected to the said conduit for delivering contaminated fuel to said metering means along with the main flow of fuel from said supplying means, and a clean fuel outlet connected to the said servomechanism, the centrifugal separator including a casing, a generally cylindrical perforate rotor in the casing adapted to be driven by the engine, and means sealing between the rotor and casing to define an inner chamber within the rotor and an outer chamber between the rotor and casing; the fuel inlet communicating with the inner chamber, the contaminated fuel outlet communicating with the outer chamber, and the clean fuel outlet communicating with the inner chamber substantially at the axis of the rotor.

5. A system as recited in claim 4 in which the rotor includes pumping vanes.

6. A system as recited in claim 4 in which a baffle is provided between the fuel inlet and the clean fuel outlet.

References Cited in the file of this patent
UNITED STATES PATENTS

| | | |
|---|---|---|
| 2,256,316 | Eddy | Sept. 16, 1941 |
| 2,515,074 | Bobier | July 11, 1950 |
| 2,856,175 | Martz | Oct. 14, 1958 |
| 2,940,517 | Skellern | June 14, 1960 |
| 2,949,957 | Eastman | Aug. 23, 1960 |